3,484,259
HIGH STRENGTH-HIGH MODULUS GLASS FIBERS

Albert Lewis, Covina, David L. Robbins, Claremont, and Lawrence W. Kelley, West Covina, Calif., assignors, by mesne assignments, to Glass Fibers Products, Inc., Azusa, Calif., a corporation of California
No Drawing. Filed Aug. 31, 1966, Ser. No. 576,211
Int. Cl. C03c 3/04, 13/00
U.S. Cl. 106—50     3 Claims

ABSTRACT OF THE DISCLOSURE

There is disclosed a silica-alumina-magnesia glass fiber with oxides of copper, zirconium, sodium and potassium in amounts to enhance tensile strength and modulus, and to lower melt temperature to facilitate volume production of fibers.

---

This invention relates to novel glass fibers which exhibit improved filament tensile strength, modulus of elasticity, temperature resistance, and density.

According to assignees' copending United States application, Ser. No. 576,531, there has recently been developed novel silica-alumina-magnesia fibers which are particularly useful in filament wound structures and structural materials because of their high tensile strength and high tensile modulus. While the filament properties described in the above-mentioned patent application are good, it has been found in use that these fibers do not completely overcome the problems associated with radial growth and buckling in composite glass-resin structures. According to this invention, it has now been found that increased fiber strength in combination with improved modulus of elasticity per unit weight is desirable, and that a reduction in wall thickness and a corresponding reduction in weight can be achieved in filament wound structures.

Thus, it is a principal object of the present invention to provide an improved form of magnesia-alumina-silica glass fibers containing cuprous oxide.

More particularly, it is an object of the present invention to provide an improved magnesia-alumina-silica glass fiber characterized by enhanced filament tensile strength, modulus of elasticity, temperature resistance and density.

A further object of the present invention is to provide a novel glass fiber which permits construction of filament wound structures of reduced wall thickness and minimum weight.

More specifically, it is an object of this invention to provide a glass fiber of greater strength per unit weight.

These and other objects and advantages of the invention will become apparent from the more detailed description that follows.

Briefly, the present invention comprises novel magnesia-alumina-silicate glass fibers which contain a small amount of cuprous oxide in an amount sufficient to improve the tensile strength and modulus of the glass. The invention further comprehends the further addition of the above-described glass composition of small amounts of sodium oxide or potassium oxide in order to flux the oxides, and thereby lower the melt temperature to further facilitate the formation of the desired glass fibers. The novel glass compositions of the present invention generally have the following composition by weight: about 36–65% silica; about 9–35% aluminum oxide; about 4–15% magnesium oxide; and a small effective tensile strength and modulus improving amount of cuprous oxide. Generally, the cuprous oxide is used in total amount of from about 1% to about 35% by weight based on the total composition. We have also found that in many formulations, the tensile strength and modulus can be further improved by the use of from about 1% to about 20% by weight of the total glass composition of zirconium oxide.

As has been indicated above, sodium oxide and potassium oxide may also be used as optional ingredients in order to lower the melt temperature and thereby improve the drawing of the glass. The sodium oxide and potassium oxide may be used in amounts up to about 10% by weight based on the total glass composition.

The glass fiber of the present invention is prepared by melting glass batches in conventional air-natural gas fired furnaces in refractory ceramic and/or refractory metal containers. The glasses are subsequently fiberized in resistantly heated refractory metal single orifice bushings.

More particularly, the batch materials as used in the manufacture of the novel glass fibers of this invention are preferably of technical grade, having a particle size of approximately 125 mesh. These materials are weighed and then mixed to insure homogeneous blending of the various ingredients. This blended mixture is then wetted with a sufficient amount of water to prevent dusting during the batch charging process. The batch is then melted at a temperature of about 2800° F. for a sufficient period of time to insure complete melting of all batch materials and provide a homogeneous glass melt. The resulting glass is then fritted by immersing it in water at a high temperature. The fritted glass is then crushed into uniform particle size and mixed with raw batch. This mixture of glass cullet and raw batch is then fed into the melting section of a fiber forming furnace. A temperature of about 2800° F. is maintained in the melting section of the furnace.

The batch and glass mixture is charged into the furnace at a rate equal in weight to the amount of fibers being drawn from the forming section of the furnace. As the batch is melted, it flows through a throat into a refining section where entrapped gases are removed prior to flowing into the forming section of the furnace. From a precious metal bushing having 204 or 408 orifices, the fibers are drawn at a rate of about 10,000 feet per minute. A bushing forming temperature of about 2400° F. is required to sufficiently reduce the viscosity (1000 poises) of the glass, permitting its attenuation into fibers. The fibers drawn at this temperature and speed have an average diameter of about 0.00035 inch. The preferred diameter range is from about 0.00030 to about 0.00040 inch. Fibers having this diameter yield the best mechanical properties. After leaving the orifices, the glass is coated with an organic sizing or coating to minimize abrasion and prevent moisture attack to the surface of the fibers.

While glass fiber compositions falling within the above range give desirable results, best filament properties are obtained within the following more narrow composition limits presented in the following examples in which all parts and percentages are by weight unless otherwise indicated.

EXAMPLE 1

The following glass was produced for a batch mixed in dry granulated form as discussed above and melted in a conventional refractory furnace at a temperature between 2500° F. and 3000° F.

| Component: | Percentage |
|---|---|
| Silica | 42.4 |
| Aluminum oxide | 31.1 |
| Magnesium oxide | 9.3 |
| Cuprous oxide | 11.1 |
| Zinconium oxide | 3.9 |
| Sodium oxide | 1.4 |
| Potassium oxide | 0.8 |

The glass was cooled to frit form and remelted in conventional resistance heated bushings for fiberizing. For a continuous fiberizing run with this glass, a temperature of about 2630° F. was used. Tensile tests on monofilaments of this glass reveal an average strength of 733,000 p.s.i. and a modulus of elasticity of 14.4 million p.s.i.

Batch compositions were mixed and melted as discussed above, formed into glass frit form and drawn into fibers as described in Example 1, in the following Examples 2 and 3.

EXAMPLE 2

| Composition: | Percentage |
|---|---|
| Silica | 40.2 |
| Aluminum oxide | 29.5 |
| Magnesium oxide | 8.8 |
| Cuprous oxide | 15.5 |
| Zirconium oxide | 3.7 |
| Sodium oxide | 1.3 |
| Potassium oxide | 0.7 |
| Forming temp. (° F.) | 2300 |
| Melting temp. (° F.) | 2650 |
| Tensile strength $10^3$ p.s.i. | 663 |
| Tensile modulus $10^6$ p.s.i. | 33.3 |

EXAMPLE 3

| Component: | Percentage |
|---|---|
| Silica | 44.9 |
| Aluminum oxide | 33.0 |
| Magnesium oxide | 9.9 |
| Cuprous oxide | 5.9 |
| Zirconium oxide | 4.1 |
| Sodium oxide | 1.5 |
| Potassium oxide | 0.8 |
| Forming temp. (° F.) | 2300 |
| Melting temp. (° F.) | 2650 |
| Tensile strength $10^3$ p.s.i. | 632 |
| Tensile modulus $10^6$ p.s.i. | 14.1 |

To achieve the superior glasses of this invention the batch formulation should fall within the following composition ranges:

| Ingredient: | Parts by weight |
|---|---|
| Silica | 159–250 |
| Alumina hydrate | 67–190 |
| Magnesium carbonate | 50–155 |
| Cuprous oxide | 3–135 |
| Zirconium silicate | 0–23 |
| Soda ash | 0–10 |
| Potash | 0–5 |
| Magnesium hydroxide | 0–55 |

The glass can subsequently be fiberized in commercially available platinum alloy bushings at speeds consistent with commercially drawn fibers. The fiber forming temperature is 2400° F. with the highest temperature in the bushing being 2700° F.

The preferred glass composition when fiberized will yield an average tensile strength of $650 \times 10^3$ p.s.i. and an average tensile modulus of $13.0 \times 10^6$ p.s.i. A range in tensile strength from $650 \times 10^3$ p.s.i. to $700 \times 10^3$ p.s.i. was obtaining from the above composition with the tensile modulus ranging from $12.5 \times 10^6$ p.s.i. to $13.5 \times 10^6$ p.s.i.

The average density of these glasses is 2.50 gr./cc. In addition, the temperature resistance property of fiber drawn from this glass is sufficiently above commercially available fiber with a softening point of 1500° F.

The average tensile strength of the best commercial glass fiber is $650 \times 10^3$ p.s.i. and the average tensile modulus is $12.6 \times 10^6$ p.s.i. with a density of 2.49 gr./cc.

We claim:
1. A novel glass fiber consisting essentially of about 42.4 weight percent silica, about 31.1 weight percent aluminum oxide, about 9.3 weight percent magnesium oxide, about 11.1 weight percent cuprous oxide, about 3.9 weight percent zirconium oxide, about 1.4 weight percent sodium oxide, and about 0.8 weight percent potassium oxide.

2. A novel glass fiber consisting essentially of about 40.2 weight percent silica, about 29.5 weight percent aluminum oxide, about 8.8 weight percent magnesium oxide, about 15.5 weight percent cuprous oxide, about 3.7 weight percent zirconium oxide, about 1.3 weight percent sodium oxide, and about 0.7 weight percent potassium oxide.

3. A novel glass fiber consisting essentially of about 44.9 weight percent silica, about 33.0 weight percent aluminum oxide, about 9.9 weight percent magnesium oxide, about 5.9 weight percent cuprous oxide, about 4.1 weight percent zirconium oxide, about 1.5 weight percent sodium oxide, and about 0.8 weight percent potassium oxide.

References Cited

UNITED STATES PATENTS

| 2,733,158 | 1/1956 | Tiede | 106—50 |
| 2,748,028 | 5/1956 | Richardson. | |
| 3,060,041 | 10/1962 | Loewenstein | 106—50 |
| 3,127,277 | 3/1964 | Tiede | 106—50 |
| 3,402,055 | 9/1968 | Harris et al. | 106—50 |
| 3,166,428 | 1/1965 | Thomas | 106—50 |
| 3,183,104 | 5/1965 | Thomas | 106—50 |
| 3,189,471 | 6/1965 | Thomas | 106—50 |
| 2,685,526 | 8/1954 | Labino | 106—54 |

HELEN M. McCARTHY, Primary Examiner

U.S. Cl. X.R.

106—52